United States Patent
Edgar et al.

(10) Patent No.: US 10,747,678 B2
(45) Date of Patent: Aug. 18, 2020

(54) STORAGE TIER WITH COMPRESSED FORWARD MAP

(71) Applicant: Seagate Technology LLC, Cupertino, CA (US)

(72) Inventors: Brian T. Edgar, Minneapolis, MN (US); Mark A. Gaertner, Vadnais Heights, MN (US); John Livdahl, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 186 days.

(21) Appl. No.: 15/336,667

(22) Filed: Oct. 27, 2016

(65) Prior Publication Data

US 2018/0121364 A1    May 3, 2018

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1008* (2013.01); *G06F 2212/1044* (2013.01); *G06F 2212/401* (2013.01); *G06F 2212/657* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2008/0104359 A1* | 5/2008 | Sauer | G06F 3/0608 711/202 |
| 2010/0161567 A1* | 6/2010 | Makela | G06F 17/30312 707/693 |
| 2011/0029569 A1* | 2/2011 | Ganesh | G06F 17/30595 707/796 |
| 2011/0231623 A1 | 9/2011 | Goss et al. | |
| 2012/0233396 A1 | 9/2012 | Flynn et al. | |

(Continued)

FOREIGN PATENT DOCUMENTS

WO    2016054212 A1    4/2016

OTHER PUBLICATIONS

Korean Office Action dated Jun. 19, 2019 for Application 10-2017-0140428.

*Primary Examiner* — Jared I Rutz
*Assistant Examiner* — Marwan Ayash
(74) *Attorney, Agent, or Firm* — Holzer Patel Drennan (57) ABSTRACT

A data storage device includes a storage tier and a storage controller operably coupled to the storage tier and configured to be communicatively coupled to a host device. The storage controller includes a first memory operably coupled to the storage controller and configured to store a superseding data structure. The storage controller further includes a second memory operably coupled to the storage controller and configured to store a forward map configured to map a plurality of logical block addresses to physical locations on the storage tier. The storage controller further includes a sifting module configured to sift the forward map based on data contained in the superseding data structure. The storage controller further includes a compression module configured to compress the forward map to generate a compressed forward map.

8 Claims, 7 Drawing Sheets

(56) References Cited

U.S. PATENT DOCUMENTS

2014/0101369 A1    4/2014  Tomlin et al.
2015/0058577 A1*   2/2015  Earl ..................... G06F 3/0613
                                                          711/136
2015/0242309 A1*   8/2015  Talagala .............. G06F 12/0246
                                                          711/103
2017/0300424 A1*  10/2017  Beaverson ............ G06F 12/109

* cited by examiner

| Logical Block Address | Physical Location |
|---|---|
| 00000000000002DEh | File 0h, offset 1DF67h |
| 0000000000000318h | File 0h, offset 45h |
| 0000000000010035h | File 1h, offset 2D4Ch |
| 0000000000011233h | File 1h, offset 2h |
| 0000000000011234h | File 1h, offset 3h |
| 00000000000193FCh | File 2h, offset 5h |
| 0000000000024321h | File 2h, offset 93D5h |

202   204

206

| Logical Block Address | Contiguous # of Blocks | Physical Location |
|---|---|---|
| 00000000000002DEh | 1 | offset 1DF67h |
| Logical Block Address Δ | Contiguous # of Blocks | Physical Location |
| 3Ah | 1 | offset 45h |
| FD1Dh | 1 | offset 2D4Ch |
| 11FEh | 2 | offset 2h |
| 81C9h | 1 | offset 5h |
| AF25h | 1 | offset 93D5h |

| Logical Block Address | Contiguous # of Blocks | Physical Location |
|---|---|---|
| 302 — 00000000000002DEh | 1 | offset 1DF67h |
| Logical Block Address Δ | Contiguous # of Blocks | Physical Location |
| 3Ah | 1 | offset 45h |
| FD1Dh | 1 | offset 2D4Ch |
| 11FEh | 2 | offset 2h |
| 81C9h | 1 | offset 5h |
| AF25h | 1 | offset 93D5h |
| Logical Block Address | Contiguous # of Blocks | Physical Location |
| 302 — 0000000000024321h | 1 | offset 62h |
| Logical Block Address Δ | Contiguous # of Blocks | Physical Location |
| 7C3h | 1 | offset 7Dh |
| 14A0h | 1 | offset 12C1h |
| 7BAh | 2 | offset 7h |
| 3584h | 1 | offset 2C5h |
| A6D8h | 1 | offset 299h |
| Logical Block Address | Contiguous # of Blocks | Physical Location |
| 302 — 000000000003439Ah | 1 | offset 4EBh |

STORAGE TIER WITH COMPRESSED FORWARD MAP

BACKGROUND

Data storage devices may use a forward map, such as a forward map searchable in O(log n) time or faster, to relate logical addresses to physical locations on a storage tier for use by a host device. Depending on the sizes of the logical and physical address ranges and the level of fragmentation of the data on the storage media, data structures representing the forward map, such as a tree or hash table, may grow too large for available memory space. Size of the data structure representing the forward map is more likely to be problematic on individual storage devices with limited memory space and dynamic storage tiers that may require frequent updates to the forward map.

SUMMARY

A data storage device includes a storage tier and a storage controller operably coupled to the storage tier and configured to be communicatively coupled to a host device. The storage controller includes a first memory operably coupled to the storage controller and configured to store a superseding data structure. The storage controller further includes a second memory operably coupled to the storage controller and configured to store a forward map configured to map a plurality of logical block addresses to physical locations on the storage tier. The storage controller further includes a sifting module configured to sift the forward map based on data contained in the superseding data structure. The storage controller further includes a compression module configured to compress the forward map to generate a compressed forward map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The present disclosure relates to mapping logical and physical addresses on a storage tier. A mapping from logical to physical addresses is referred to herein as a forward map. A forward map may be used to find physical addresses of data based on a logical address for use by a host device to access the data. On data storage systems with very large memory capacity, a forward map may be represented with a data structure, e.g., a tree, index file, hash table, etc., that may provide an updateable and searchable representation of the forward map. A characteristic of a data structure representing a forward map may be that searching it satisfies a search metric, including without limitation a search complexity that satisfies O(log n) or better logarithmic searching. Data structures with these capabilities carry a memory footprint cost, depending on their size, and may not be able to grow large enough to maintain a forward map to within the constraints of the available memory on a data storage device. More memory to store a data structure representing the forward map may be needed where the data storage media has a large range of physical addresses and/or where the fragmentation levels are expected to be large. For devices to increase the size of a forward map and retain favorable searching and updating capabilities, a compressed forward map, e.g., a forward map compressed with Huffman codes, may be substituted for the data structure to reduce the memory footprint associated with storing the forward map, but other compression schemes or encodings are also contemplated.

A compressed forward map may preserve search capabilities, such as the ability to search in logarithmic time or better, while occupying a smaller memory footprint than tree or hash table-based data structures. Regarding modifications to a compressed forward map, in some cases it is possible to update the forward map described herein without first decompressing, as described in more detail below. In cases where a change to the compressed map is not possible without decompressing, a separate data structure may be instantiated and maintained to store any superseding entries that cannot be entered on the compressed forward map, referred to herein as a superseding data structure. The compressed forward map may be implemented in a variety of memory structures, including without limitation a static buffer, a circular buffer, a dynamic memory, etc. and/or any combination thereof.

When the separate data structure of superseding entries nears a capacity condition or a refresh condition, a "sift" operation may decompress the compressed forward map, either piecewise or in full, merge superseding entries from the separate data structure, then recompress the forward map and discard the separate data structure, either some entries or in full. The forward map remains searchable during the sift operation because the separate data structure (or subset thereof) "slides over" into the domain of the compressed forward map for search purposes, while any new superseding entries are made to a surviving higher precedence (possibly newly instantiated) separate data structure that will store future superseding entries during and after the sift operation until it is merged into the forward map in the next sift operation. The sifting operation will amortize the costs of changing a compressed list. The more superseding entries sifted in to a compressed forward map, the more efficient the sifting operation will be.

Figure 1:
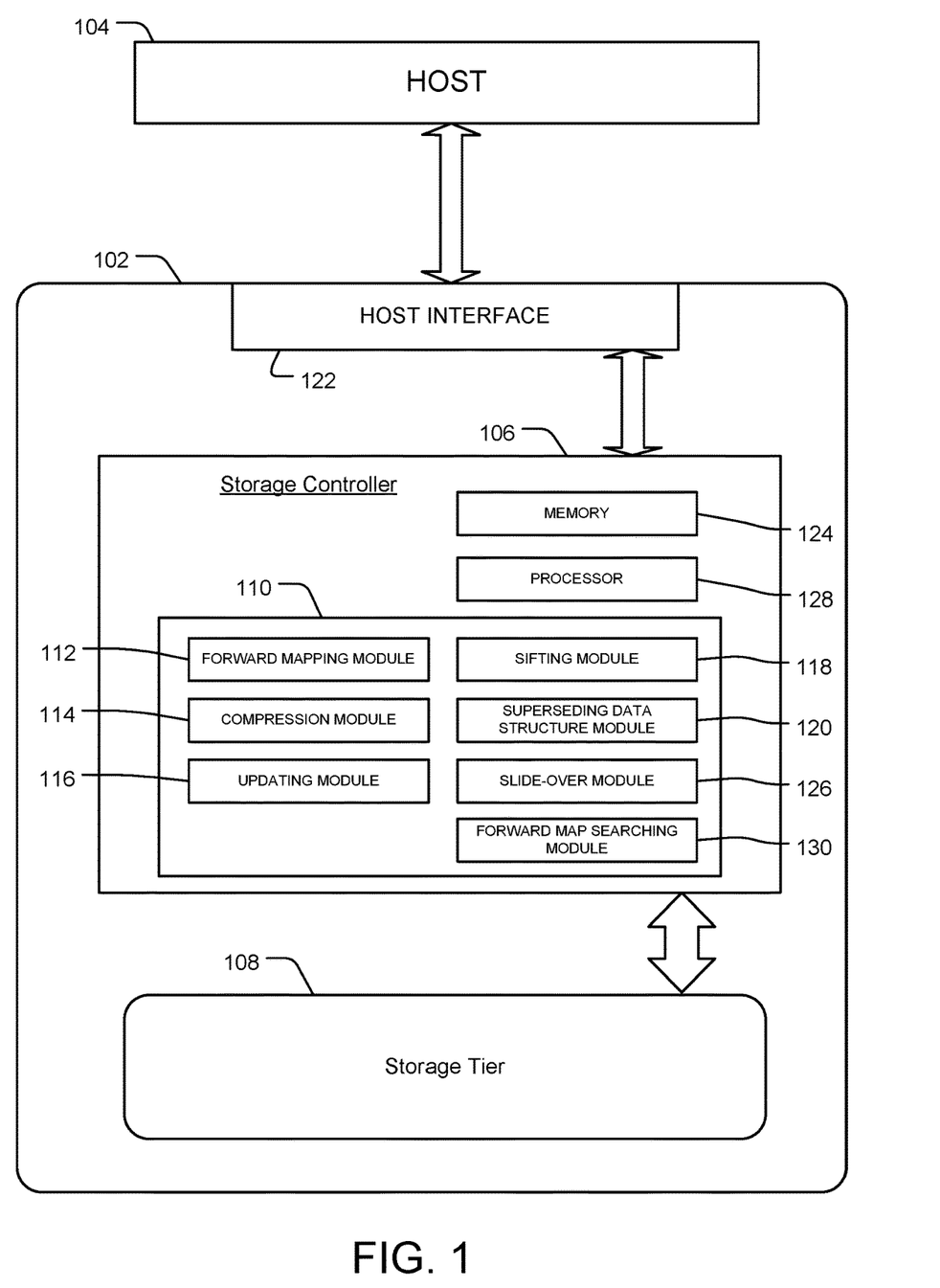
FIG. 1 is a block diagram of an example apparatus for managing a storage tier with a compressed forward map.

FIG. 1 is a block diagram of an example apparatus 100 for managing a storage tier with a compressed forward map. The apparatus 100 includes a data storage device 102 with a storage controller 106 that communicatively couples a storage tier 108 to a host 104 via a host interface 122. In an implementation, the storage tier 108 is a dynamic storage tier. The storage controller 106 provides a mechanism to allow the host 104 to store data to and retrieve data from the storage tier 108. In an implementation, the storage tier 108 is a data cache, including without limitation a volatile random access memory (RAM) storage media such as DRAM, or a non-volatile RAM, such as NAND flash memory. In another implementation, the storage tier 108 is a main data store, such as a rotating magnetic disk data storage media.

The storage controller 106 may utilize communication interfaces and protocols including SATA, SCSI, eSATA, SAS, USB, and others to communicate with the host 104 via the host interface 122. The storage controller 106 also includes functional modules 110, such as a forward mapping module 112, a compression module 114, an updating module 116, a sifting module 118, a superseding data structure module 120, a slide-over module 126, and a forward map searching module 130. The forward mapping module 112 generates a forward map relating logical block addresses to physical locations. The forward map searching module 130 searches the forward map to located a region of the forward map corresponding to a logical block address. In an implementation, the searching module 130 is configured to locate, in at worst O(log n) time, a region of the compressed forward map corresponding to a logical block address using at least one of: an index file, a tree, milestone entries, and a hash table. The compression module 114 may rewrite a forward map into a compressible format (e.g., by substituting logical block address deltas for a subset of full-width logical block addresses, adding values for contiguous number of blocks, removing any data that can be inferred from other data, such as, in this example, the "file number" which equals the logical block address with the lower 16 bits of binary representation dropped, etc.). The compression module 114 may further compress a compressible forward map to generate a compressed forward map according to various compression techniques. The compression module 114 may also uncompress a compressed forward map as part of a sifting operation, a searching operation, or for purposes preparing the compressed forward map for updating entries in the forward map. The updating module 116 may perform updates to any data in a forward map, a compressible forward map, and/or a compressed forward map. For example, the updating module 116 may mark an entry in a compressed forward map as deleted by editing the value in the physical location field to a special value that indicates the entry is deleted. The updating module 116 may further update the physical location field in a compressed forward map by substituting an equal width or a narrower-width location for the value in the entry's physical location field. The updating module 116 may further make any edits to an uncompressed forward map or a compressible forward map.

The storage controller 106 may further include a sifting module 118 for performing sifting operations disclosed herein. The sifting module 118 may itself decompress a compressed forward map or it may invoke the compression module 114 to decompress a compressed forward map. The sifting module 118 may perform other functions relating to a sifting operation, as explained in more detail below, including determining when a sifting operation should be performed, storing, copying, performing operations on, and/or moving a compressed or uncompressed forward map to or from the memory 124.

The storage controller 106 may include a superseding data structure module 120. The superseding data structure module 120 may perform operations including instantiating a new superseding data structure for use during and after a sift operation, updating a superseding data structure to include entries or changes to entries that are not suitable to be made directly on a compressed forward map without significantly uncompressing the compressed forward map, supplying superseding entries to the sifting module 118 for use in performing sifting operations, searching a superseding data structure in response to requests from the host, and other operations disclosed herein. The storage controller 106 may further include a slide-over module 126. The slide-over module 126 may perform operations including moving a superseding data structure into the domain of a compressed forward map during a sift operation to facilitate searching the superseding data structure and the compressed forward map during the sift operation. The storage controller 106 may further include a forward map searching module 130. The forward map searching module 130 may perform searches on a compressed, uncompressed, and/or sifted forward map as well as on a superseding data structure. For example, the forward map searching module may accept read, write and/or erase requests from the host 104 via the host interface 122, and perform the requested operations on a compressed, uncompressed, and/or sifted forward map as well as on a superseding data structure.

The storage controller 106 also includes a memory 124 for storing data and/or functional modules 110 consistent with the present disclosure. In an implementation, the memory 124 stores a forward map, a compressed forward map, a superseding data structure, and/or a newly instantiated superseding data structure for use during a sift operation. The storage controller 106 further includes a processor 128. The processor 128 may perform any of the functions of the storage controller 106 including any functions disclosed herein as performed by any of the functional modules 110. The processor 128 may execute instructions stored on non-transitory computer readable media to perform any of the functions of the storage controller 106 disclosed herein.

One aspect of the storage controller 106 is abstraction of operations of the data storage device 102 with respect to the storage tier 108. For example, the host 104 may access data by reference to logical block addresses (LBAs) that are mapped by the storage controller 106 to physical addresses organized according to a different physical addressing scheme than the logical block addressing scheme, e.g., an addressing scheme based on cylinders, heads, sectors, offsets, files, etc. The storage controller 106 may use one or more of a forward map, a compressed forward map, a superseding data structure, and/or a newly instantiated superseding data structure for use during a sift operation to correlate LBAs to physical addresses on the storage tier 108. When the host 104 sends a data access request for data according to its LBA address, the storage controller 106 may correlate the data at the requested LBA to a physical address, and may return the requested data to the host 104 via the host interface 122 without the host's knowledge of the physical location of the requested data.

Figure 2:
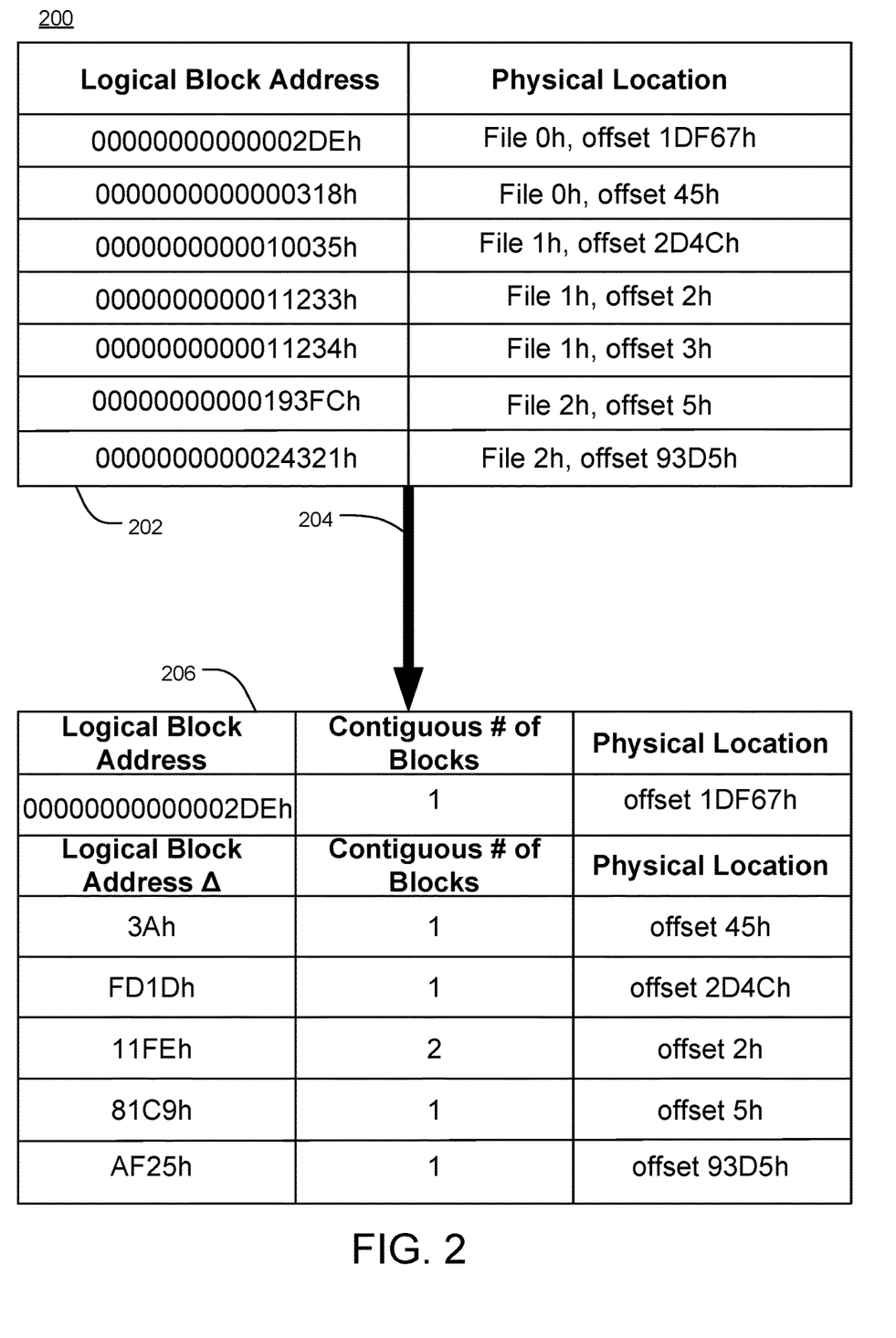
FIG. 2 is an intermediate level of compression of an example forward map.

FIG. 2 is an intermediate level of compression of an example forward map 200. The example of FIG. 2 is provided by way of introduction and example. Other intermediate levels of compression of a forward map may also be used. An uncompressed forward map 202 correlates logical block addresses in the first column to physical locations in the second column. Each entry in the first column contains the full address of the logical block, and each entry in the second column contains the file and offset value of the physical location corresponding to the logical block address in the same row. Other formats for describing the physical location are also possible. The file and offset value of the physical location corresponding to the logical block address are merely by way of example. The full address of the logical block is also referred to as the "full-width" address. The forward map 202 includes only certain logical block addresses because the forward map 202 applies only to a subset of the logical block address space. Other logical block addresses not included in the forward map 202 are either in a different tier, layer, cache, etc., or are placed in the same tier, layer, or cache, etc. in a way such that the physical location is currently implied or otherwise more trivially identified.

When a host submits a data access request for a logical block address, the storage controller may determine the physical location of the data at the requested logical block address according to the forward map 202, and may return that data to the host via the host interface. In an implementation, the forward map 202 may consist of a maximum number of physical entries that require representation, such as for a data storage media of a fixed size. In another implementation, the forward map 202 may only increase in size, such as when more data storage media is added to a data storage device handled by a data storage controller.

The forward map compression scheme may include a first operation 204 for preparing the uncompressed forward map 202 and outputting the compressible forward map 206. In contrast to the uncompressed forward map 202, the compressible forward map 206 contains three columns of data for each row. There are several characteristics of the data presented in the compressible forward map 206 that differ from the uncompressed forward map 202. First, the information contained in the first column of the compressible forward map contains either a full-width logical block address or a logical block address delta. The full-width logical block address in the first row of the compressible forward map 206 is the same as the entry in the first column of the uncompressed forward map 202.

The remaining rows in the first column of the compressible forward map 206, however, contain only logical block address deltas, meaning the logical block distance from the previous logical block address in the map. For example, the second row containing data in the forward map 206 (which is in an intermediate stage of compression) contains the value 3Ah in the Logical Block Address Delta column. 3Ah is equal to 318h minus 2DEh, i.e., the difference between the previous two logical block addresses in the uncompressed map 202. Similarly, the entry in the third row containing data in the compressible map 206 is FD1Dh. FD1Dh is equal to 10035h minus 318h, i.e., the difference between the previous two logical block addresses in the uncompressed map 202. This characteristic of the forward map 206 is in preparation to take advantage of the fact that the difference between the increasing logical block addresses in the first column are much "narrower" in terms of their representation in a radix than the full-width logical block addresses themselves. Alternatively, or additionally, the logical block address deltas can be relative to the logical block address plus the length (in continuous number of blocks) of the previous entry.

The characteristic of narrower logical block address deltas than logical block addresses may be guaranteed to be true under certain conditions. For example, if there is a sufficient density of mapping table entries, such as when there are a large number of table entries confined to a certain range of logical blocks, then it is not possible for all the logical block address deltas to be exceedingly distant from one another in the logical block addressing space. In other words, the denser the mapping, the less room will be available between logical block addresses. If the mapping is dense enough, storing only logical block address deltas will save space compared to storing full-width logical block addresses.

Another differing characteristic of the compressible forward map 206 compared to the uncompressed forward map 202 is a new column labeled Contiguous Number of Blocks. The data in this column is based on a conclusion that contiguous logical blocks stored physically contiguously is likely to be a common feature of a forward mapping on a storage tier. Contiguous logical blocks stored physically contiguously are likely because data transfers to be written to the storage tier typically have a start logical block address and a length. Rather than dedicating a row to each contiguous logical block stored physically contiguously (such as in the fourth and fifth rows of the uncompressed forward map 202), the compressible forward map 206 includes the additional column labeled Contiguous Number of Blocks to reflect the number of contiguous logical blocks stored physically contiguously after the start logical block indicated by the entry in the Logical Block Address or Logical Block Address Delta column. Any entry greater than 1 in the Contiguous Number of Blocks column indicates that rows have been saved by implying the location of the next logical block(s).

For example, in the uncompressed forward map 202, the fourth and fifth rows indicate contiguous logical addresses that are stored in contiguous physical locations. These two rows have been combined into a single row in the compressible forward map 206—the fourth row containing data starting with Logical Block Address Delta 11FEh—by indicating that the Contiguous Number of Blocks following the logical block with address delta 11FEh is 2. A host request for the data stored at logical block address 00000000000011234h does not correspond to a row in the compressible forward map 206, but the physical location of the requested data may nonetheless be inferred from the information in the fourth row of the compressible forward map 206 because the Contiguous Number of Blocks data in that row is 2. Including the Contiguous Number of Blocks column in the compressible forward map 206 therefore permits the omission of rows of data, and thus reducing the size of the map, under the conditions described above.

Yet another differing characteristic between the uncompressed map 202 and the compressible forward map 206 is the data contained in the third column indicating the physical location of the logical block in each row. The data in this column lacks the "file number" information that was present in the uncompressed map 202. "File number" information, as an example aspect of the physical location, may be omitted from the data in this column under certain circumstances. For example, if the file number corresponds to the most significant 48 bits (i.e., the first 12 hexadecimal digits) of the full-width logical block address, then the file number may be implied rather than expressly listed in the table.

The example intermediate stage compressible forward map 206 may be further compressed according to a number of compression techniques. In an implementation, the compressible forward map 206 may be compressed using a Huffman encoding. In a Huffman encoding, entries in the compressible forward map 206 may be represented by various formats. The format of each table entry may be indicated in the compressed representation by a Huffman prefix or similar compression prefix. In the compressible forward map 206, the logical block address delta field, the number of contiguous blocks field, and the physical location field for each row will have widths that vary from entry to entry, where the "width" means the number of digits required to represent the data in a particular radix, i.e., the "base" of the data or the number of unique digits used to represent the data in a positional numbering system. Since the Huffman prefixes themselves will also require different amounts of memory due to their differing lengths, shorter Huffman prefix codes may be chosen for the more commonly applied forward map table entry formats. As forward map table entry formats become less common, longer Huffman prefixes may be used. This strategy of allocating Huffman prefixes reduces the memory needed to store the compressed forward map.

Other implementations of Huffman codes are also available for compressing the compressible forward map 206. For example, the Huffman prefix can specify the format of an entire entry including the fields for logical block address delta, number of contiguous blocks, and physical location. Alternatively, each field in an entry may have its own Huffman prefix. In another implementation, entry encodings may indicate that the value for a certain field has a certain relationship to a field value in an entry a certain distance back in the compressed representation of the table. For example, the physical locations for some logically nearby entries could have a succinctly described relationship. In another implementation, distinct entries in the compressed forward map may contain different fields with respect to the other entries in the forward map. The absence of certain fields in certain entries could imply values for those fields in a decompressed representation, or could imply something else, such as if some fields are truly absent in some entries. In yet another implementation, multiple forward maps for distinct data storage tiers are represented in one compressed map data structure.

Figure 3:
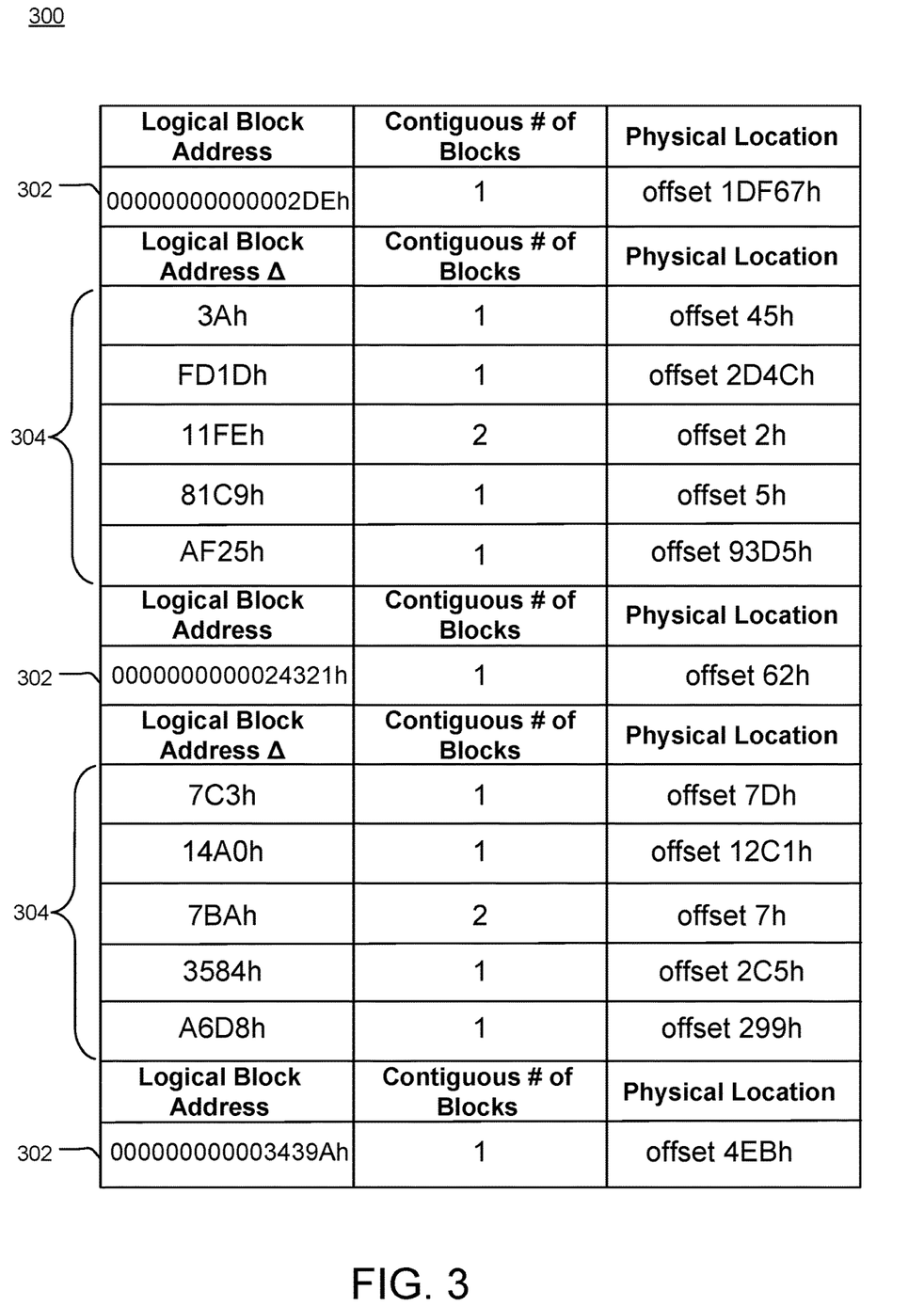
FIG. 3 is an example compressed forward map with milestone logical block address entries.

A forward map may have certain characteristics such as the ability to efficiently receive updates to the mapping of logical block addresses to physical addresses or the ability to efficiently search the forward map. One characteristic may be the ability to search the forward map in logarithmic time. As used herein, searching in logarithmic time means a time complexity of the forward map search algorithm bounded by the function O(log n), where n is the number of entries in the forward map. A compressed forward map according to the present disclosure may be searched in logarithmic time, even though the forward map is compressed. In an implementation, a compressed forward map 300 illustrated in FIG. 3 includes "blocks" of logical block addresses where a "block" includes a full-width logical block address 302 (also referred to as "block headers" or milestones) followed by an ordered set 304 of logical block addresses represented only by logical block address deltas. Including blocks of logical block addresses represented only by logical block address deltas, separated by milestone entries including full-width logical block addresses, may improve ability to search the compressed forward map in O(log n) time or better. The compressed forward map of FIG. 3 is only an example of a compression strategy that may be used; other compression strategies may also be used. In another implementation, dynamic memory storage may be used to store the compressed forward map. As it pertains to O(log n) search time, the milestone entries could alternatively be implemented by an index file or other data structure that is physically separate from the rest of the compressed forward map.

The compressed forward map 300 may be searched for an entry in a binary search manner: the search algorithm may first examine "block headers" 302 to locate the particular range 304 containing the searched-for entry, then search the particular range 304 for the searched-for entry itself. By choosing the number of entries in the ranges 304 of logical block addresses represented only by logical block address deltas, an upper bound on the amount of decompression necessary to locate a logical block address may be established. The larger the ranges 304 of logical block addresses represented only by logical block address deltas between milestones 302, the higher the bound on the decompression needed to locate an entry. In an implementation, the "block headers" or milestones 302 remain uncompressed to increase the efficiency of the binary search operation, and only the ranges 304 of logical block addresses represented by logical block address deltas are compressed. In another implementation, both the milestones 302 and ranges 304 of logical block addresses represented only by logical block address deltas are compressed. In yet another implementation, decompression of both the milestones 302 and ranges 304 of logical block addresses represented only by logical block address deltas do not require information from outside the initial indexed "coarse" search that uses the milestones. The milestone may exist to allow decompression of a local range of the compressed list without having to consult any, or without having to consult significant, content outside the local range.

Another characteristic for a compressed forward map is that it may be efficiently updated even if the forward map is associated with a dynamic storage tier that must be updated hundreds or thousands of times per second. Updating the forward map without significantly (if at all) decompressing and recompressing is referred to herein as "direct updating." Direct updating may be available for deleting an entry in the compressed forward map. Deleting an entry may involve editing the entry's value in the physical location field in the compressed representation to a special value that indicates the entry has been deleted. A sifting operation may eliminate such entries marked as deleted at a later time as explained below. Another example of direct updating is when the data in a logical block address migrates from a first physical location to a second physical location wherein the description of the second physical location is narrower than or equal in width to the first physical location. In this context, "narrower" indicates that the description of the second physical location contains fewer digits in the relevant radix. In this case, the physical location field in the compressed forward map associated with the migrated data may simply be edited. Yet another example of direct updating is when only part of an entry's extent is deleted, such as when an entry in the forward map comprises more than one contiguous block. In this case, the entry's length and/or the entry's logical block address delta field may be reduced without exceeding the limitations of the compression encoding. In an embodiment, the logical block address delta field for the entry preceding or the entry subsequent to the entry sought to be deleted may also be adjusted to accommodate deletion of only part of an entry's extent.

In cases where updating the compressed forward map is not possible without significantly decompressing and/or recompressing the forward map, a separate data structure may be instantiated and maintained to store entries that supersede the information in the compressed table. The separate data structure may be a quickly modifiable and efficiently searchable structure. In an implementation, the separate data structure may be a tree, such as a B+ tree or a red/black tree, or a hash table. When the separate data structure nears a size limitation, or when a refresh condition is satisfied, a "sift" operation may decompress the forward map, discard any deleted or superseded logical ranges, insert table entries from the separate data structure, and recompress the forward map.

Figure 4:
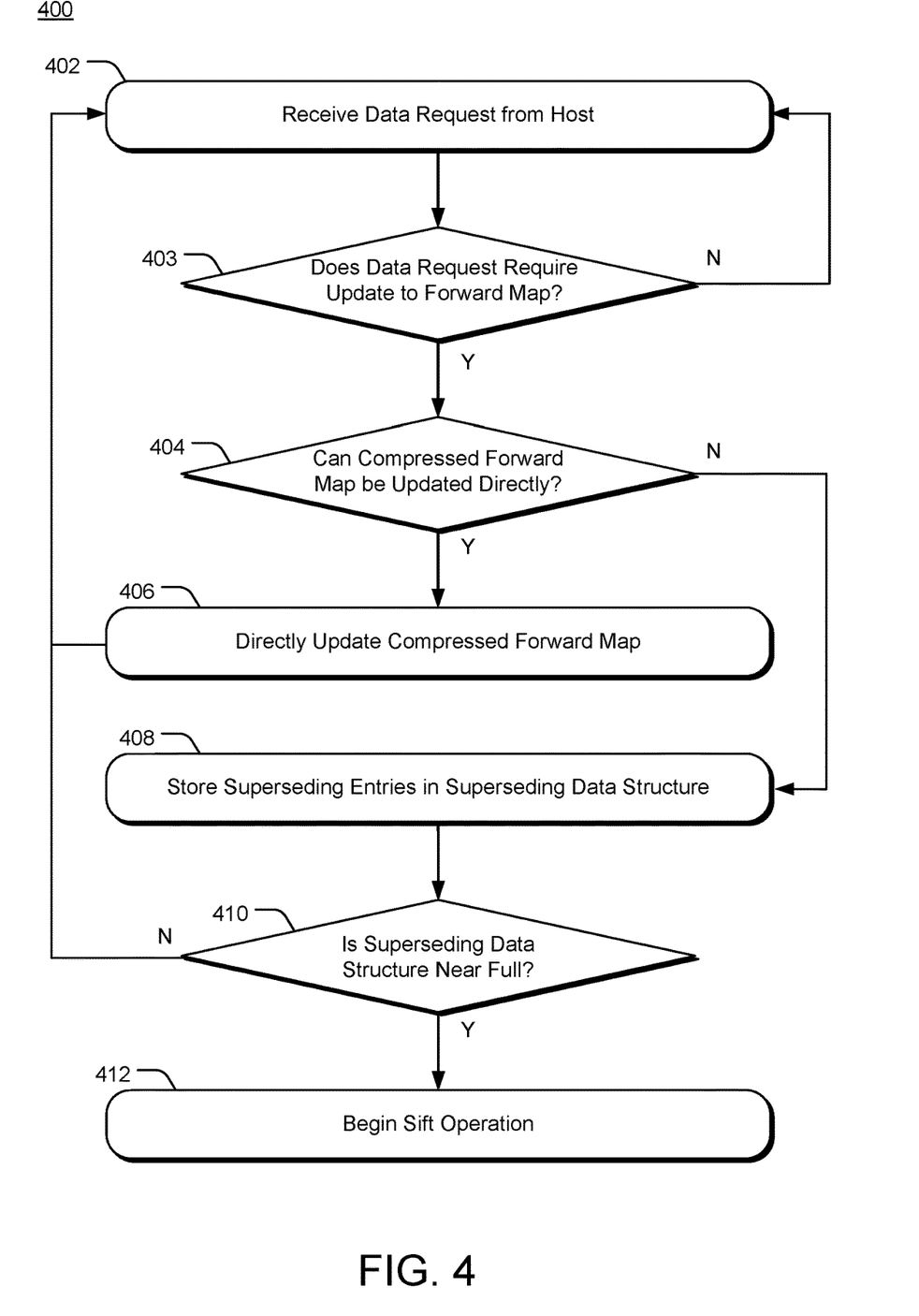
FIG. 4 illustrates example operations for updating a forward map.

FIG. 4 illustrates example operations 400 for managing a storage tier with a compressed forward map. The operations 400 may be carried out by a processor and/or memory on a storage controller on a storage device containing a storage tier. Operation 402 is receiving a data request from a host, such as a request to write data to or delete data from a storage tier. To accommodate the data access request from the host, it may be necessary to make an update to the compressed forward map to add a new entry, delete an entry, or otherwise edit the data in the compressed forward map. If accommodation of the data access request from the host requires an update to the forward map at decision block 403, the method 400 proceeds to decision block 404. If accommodate of the data access request from the host does not require an update to the forward map, such as a data read access request, the method 400 returns to operation 402. If it is possible to directly update the compressed forward map at operation 404, such as when the disk access request includes a request to delete an entry, migrate an entry to a "narrower" physical location, delete only a part of an entry's extent, etc., then the compressed forward map is directly updated at operation 406, for example by an updating module on the storage controller. If it is not possible to directly update the compressed forward map at operation 404, then an entry or entries representing changes to the logical block address to physical location mapping may be stored in a separate data structure in operation 408, for example by a superseding data structure module on the storage controller. The superseding data structure may be any readily modifiable and searchable data structure, including without limitation a tree or hash table data structure. In an implementation, the superseding data structure may be stored in a memory on the storage controller.

Figure 5:
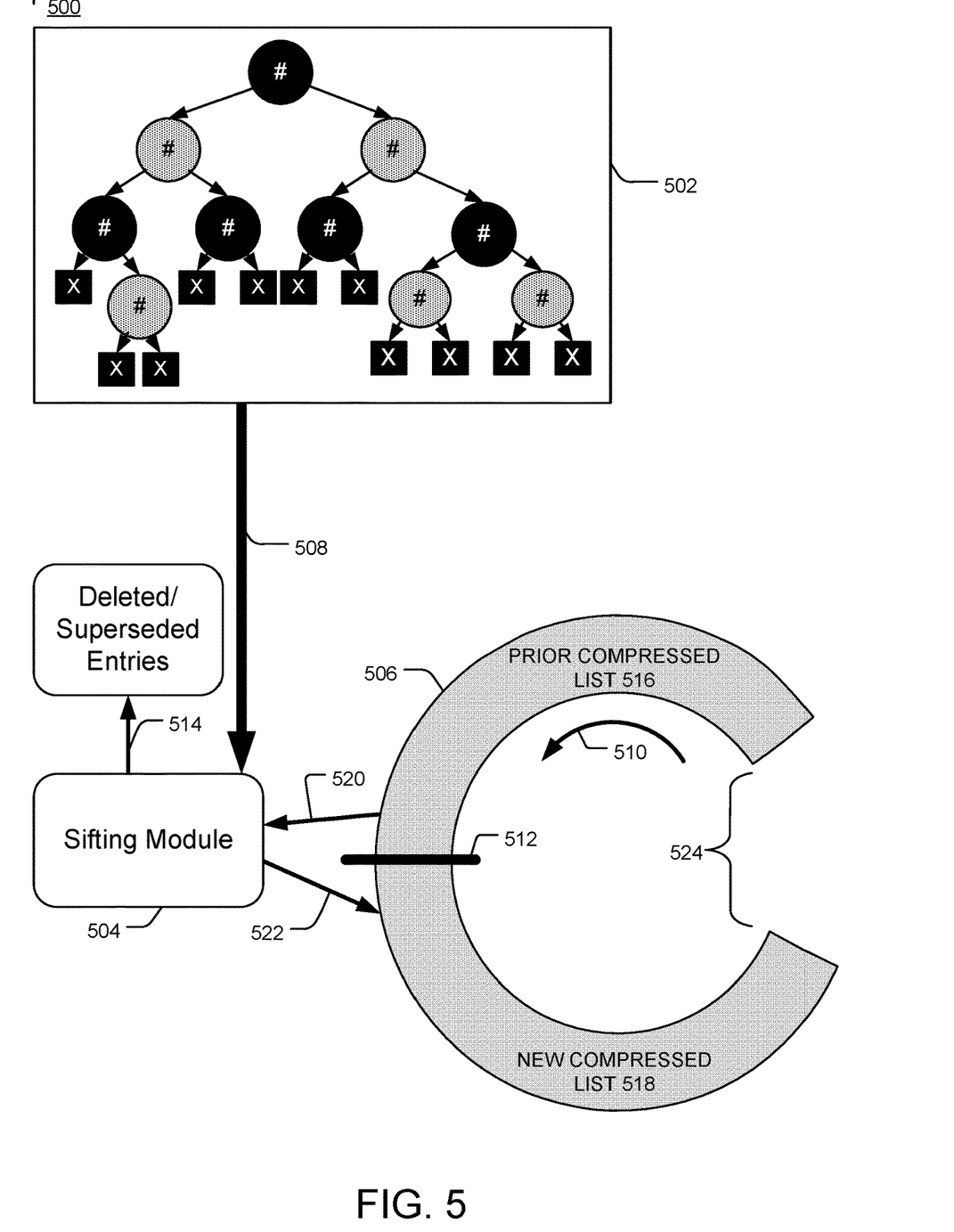
FIG. 5 is an example simplified diagram of a sift operation on a compressed forward map in a circular buffer.

If the separate data structure is full or near full at operation 410, then a sift operation begins at operation 412. In FIGS. 4 and 5, the sift operation processes the entire compressed forward map. The sift operation may still be performed in short bursts for considerations of computing machinery and/or for considerations of contention or coherence between searching and sifting. In an implementation, the sift operation may be carried out by a sifting module on the storage controller. The separate data structure may be considered full if the separate data structure satisfies a size condition. In another implementation, the separate data structure may be considered full if a minimum amount of time has passed since the prior sift operation. The operation 410 need not depend only on whether the size of the separate data structure occupies a certain amount. Operation 410 may depend instead on the amount of system resources dedicated to the sift operation since the larger the separate data structure grows, the more resource intensive the sifting may be. For example, the operation 410 may depend on the amount of memory available in the memory on the storage controller. In this sense, the sift operation is "tunable" because the condition that determines whether the separate data structure is "full" is adjustable based on the aforementioned considerations. If the separate data structure is not full at operation 410, then the operations 400 return to operation 402 to receive the next data request from the host.

FIG. 5 is a simplified diagram 500 of a sift operation on a compressed forward map 506 in a circular buffer. In an implementation, the circular buffer may be stored on a memory on a storage controller coupled to a storage tier. Other memory configurations for storing the compressed forward map are also possible. A superseding data structure 502 contains updates to the forward map that were not possible to make directly on the forward map 506 in its compressed state in the circular buffer. In other words, entries in the superseding data structure 502 are entries that the system would not have been able to make to the compressed forward map without significantly first decompressing the forward map, then updating the uncompressed forward map with the entries, and then recompressing the forward map after updating.

In FIG. 5, a sifting module 504 on the storage controller decompresses the prior compressed list 516, consuming it as indicated by arrows 510 and 520. The sifting module receives updates from the superseding data structure 502 as indicated by arrow 508. The sifting module removes deleted and superseded entries as indicated by arrow 514. As the sifting module recompresses the entries, the new compressed content is appended to the new compressed list 518 as indicated by arrow 522. As the new compressed list is appended and the prior compressed list is consumed, the gap 524 in the circular buffer 506 moves counterclockwise until it reaches the bar 512. The bar 512 is the boundary (established at the start of the sift) between the prior compressed list 516 and the new compressed list 518. The portion of the circular buffer below bar 512, labeled as new compressed list 518, is the portion of the compressed forward map that includes entries from the prior compressed list.

The circular buffer 506 includes a gap 524 such that the compressed forward map does not occupy the entire circular buffer. The circular buffer containing the compressed forward map 506 is sized to account for the possibility that the sift operation carried out by sifting module 504 does not encounter any deleted or superseded entries until the end of the sift process. In other words, if the sifting module 504 does not encounter any deleted or superseded entries 512 until the end of the sift process, there may be points in time during the sift operation where the combination of the merged compressed portion of the forward map plus the portion of the forward map that has not yet been processed by the sifting module 504 is larger than the compressed forward map 506 was before the sift operation started. To account for the potential increase in size during the sift operation, the gap 524 in the circular buffer may be used. The gap 524 may be sized such that it will not completely close even if a sifting module 504 encounters all of the deleted and superseded entries only late in the sifting process.

Figure 6:
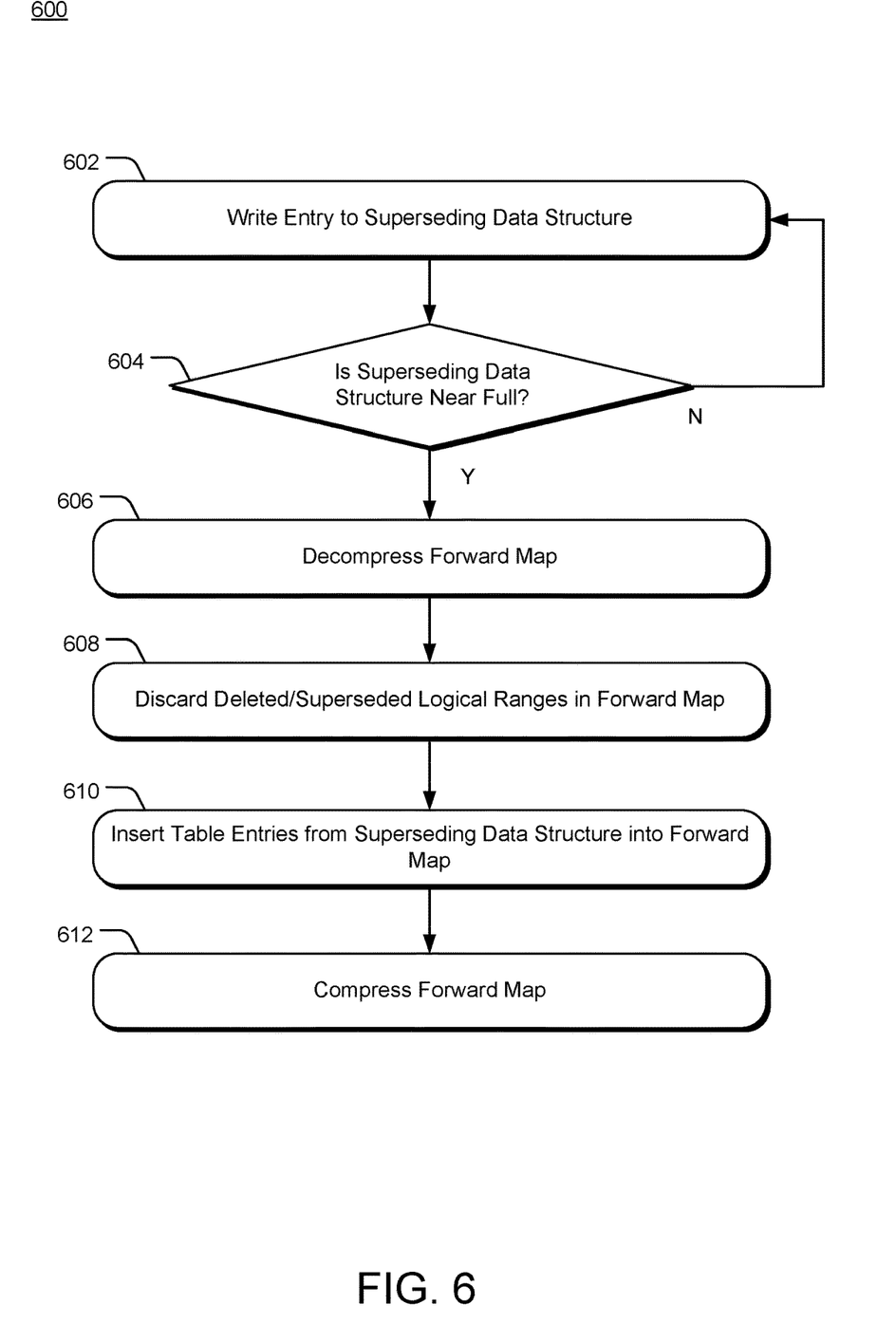
FIG. 6 illustrates example operations for a sift operation.

FIG. 6 illustrates example operations 600 for a sift operation. Operation 602 is writing an entry to the superseding data structure. In an implementation, the entry represents a data access request from a host that is not suitable to be directly written to the compressed forward map. The entry may be written to the superseding data structure by a superseding data structure module on the storage controller. It should be understood that not directly written to the compressed forward map means that the entry may not be made to the compressed forward map without significantly decompressing the forward map first and recompressing after the update. For example, if the host requests to write data to a new logical block, then that update to the compressed forward map may not be possible without decompressing the forward map. As another example, if the host sends a data access request that requires migration of data from a physical location to a destination physical location with a "wider" than the origination physical location, then it may not be possible to directly update the compressed forward map. For a destination physical location to have a "wider" description than the origination physical location, it means that the destination entry in the physical location field for the logical block address containing the migrated data has more digits in the relevant radix than the origination physical location.

If the superseding data structure is near full at operation 604, the sift operation begins with decompressing the compressed forward map at step 606. Step 606 may be carried out by a sifting module on the storage controller. In an implementation, the compressed forward map may be implemented in a dynamic memory. If the superseding data structure is not near full at step 606, the operations 600 return to operation 602 to write another entry to the superseding data structure that cannot be written directly to the compressed forward map, such as by a superseding data structure module on the storage controller. In an implementation, the condition needed to be satisfied for the superseding data structure to be considered near-full depends on the available memory for storing the superseding data structure. If a predetermined fraction of the memory available to store the superseding data structure is occupied by the superseding data structure, then the superseding data structure may be considered to be near-full. In another implementation, the superseding data structure may be considered to be near-full when the superseding data structure contains a minimum number of entries.

In some cases, the compressed forward map may grow during the sift operation if a substantial number of new entries are added to the forward map before deleted and superseded entries are discarded. In an implementation, the circular buffer containing the forward map may include a "gap" or free space to accommodate the possibility that the compressed forward map may need to grow before it can be pruned by discarding deleted and superseded entries. The larger the superseding data structure becomes, the larger the potential need for a "gap" in the circular buffer containing the compressed forward map becomes. Since a circular buffer containing the compressed forward map may have a limited amount of space, a sift operation may be performed before the number of superseding entries needed to be merged into the compressed forward map exceeds a limit such that the compressed forward map does not grow too large to fit in the circular buffer during the sift operation. In another implementation, the superseding data structure may be considered near-full based on a dynamically changing limit, the dynamically changing limit based on the position of entries that would be deleted or discarded in the compressed forward map such that a sift operation will not cause the compressed forward map to exceed the available space in the circular buffer containing the compressed forward map.

The result of the sift operation may be saved to a data storage media. In an implementation, the result of the sift operation may be saved to a journaling system snapshot. In yet another implementation, the result of the sift operation may be saved over the course of several media operations. In yet another implementation, the result of the sift operation may be saved concurrently with an accumulating journal including at least a portion of the history of the superseding data structure from the start of the sifting operation. The history of the superseding data structure may begin from the start of the sifting operation and include a slide over of the superseding data structure to the domain of the compressed forward map. The accumulating journal may be saved in a nonvolatile memory, and may include information regarding modifications to the forward map.

The accumulating journal may be replayed in certain scenarios, such as when the accumulating journal is not missing any information regarding modifications to the forward map. Another implementation includes generating a list of edits to the saved result of the sift operation, storing the list of edits to the saved sift result in a concise format for application after the saved sift result becomes resident. Generating and storing the list of edits may be performed while the saved sift result is loading.

Operation 606 decompresses the forward map. The forward map may be compressed according to a number of compression or encoding schemes, such as using Huffman codes. The Huffman codes may be applied to compress the forward map in a number of ways. For example, the Huffman prefix can specify the format of an entire entry including the fields for logical block address delta, number of contiguous blocks, and physical location. Alternatively, each field in an entry may have its own Huffman prefix. In another implementation, entry encodings may indicate that the value for a certain field has a certain relationship to a field value in an entry a certain distance back in the compressed representation of the table. In an implementation where the forward map is stored on dynamic memory, operation 606 may include only decompressing small portions of the forward map. When only small portions of the forward map are decompressed at operation 606, only the small decompressed portions may be operated on by the sifting and recompressing operations.

After the forward map has been decompressed in operation 606, operation 608 discards deleted and/or superseded entries in the forward map. One type of entry removed by operation 608 are deleted entries. Deleting entries are one type of change that may be made to the compressed forward map directly without decompressing because the physical location field of the entry to be deleted could be set to a special value indicating the deletion of the entry. During operation 608, the entries that have been marked as deleted by setting the special value in the physical location field are removed from the compressed map. Another type of entry removed by operation 608 are superseded entries. Superseded entries may remain in the forward map after a change was made to the physical location of a logical block address, but the change would have required significantly decompressing the forward map to make the change to the forward map itself. Instead of decompressing, the superseding entry was made to a superseding data structure. Operation 608 may iterate through the superseding data structure to find entries that could not have been made to the forward map directly when it was compressed, and makes changes to the uncompressed forward map reflecting the entries in the superseding data structure.

Operation 608 may include saving the result of the sift operation. In an implementation, the result of the sift operation may be saved to a journaling system snapshot, possibly over the course of multiple media operations. Saving the result of the sift operation over the course of multiple media operations may keep the system responsive to other requisite media operations to be made while the results of the sift operation are being saved. In another implementation, the result of the sift operation may be saved concurrently with an accumulating journal that includes the history of the superseding data structure from the time after the sift was started, which may include the moment of a slide over. The result of a sift operation may be saved to a nonvolatile memory that is chosen because the nonvolatile memory is the most plentiful available nonvolatile memory and/or least precious nonvolatile memory. Any journal saved to the less precious nonvolatile memory may include extra information regarding modifications to the forward map. Such modifications allow the accumulating journal to be replayed concurrently with the sift result loading should there be a period of time after power restoration before the saved sift result has been restored to residency. After the accumulating journal has been replayed, the system may wait for the saved sift result to be restored to residency, as the forward map can receive further updates and searches after the forward map has been restored, before replaying an accumulating journal that is missing the extra information regarding modifications to the forward map. Waiting for the saved sift result to be restored to residency allows the more precious journal memory (which may contain the end of the journal that follows the portion saved to the less precious nonvolatile memory) to contain more history per byte since it omits the extra information, which becomes available once the saved sift result is restored to residency.

Operation 610 is inserting table entries from the superseding data structure into the forward map. In an implementation, new entries may not be made directly to the compressed forward map. Instead, when a host sends a data access request that requires a new entry to be added to relate a physical location to a logical block address, the entry is made instead to the superseding data structure. These new entries are made to the uncompressed forward map at operation 610. If the forward map is implemented in a dynamic memory, operation 610 may include operations such as local, partial, and/or piecewise sift operations.

Operation 612 is to compress the forward map again after operations 608 and 610 are completed. Various encodings or compression schemes may be used to compress the forward map including without limitation, Huffman encoding. The format of each table entry may be indicated in the compressed representation by a Huffman prefix or similar compression prefix. In an uncompressed forward map, the logical block address delta field, the number of contiguous blocks field, and the physical location field for each row will have widths that vary from entry to entry, where the "width" means the number of digits required to represent the data in a particular radix, i.e., the "base" of the data or the number of unique digits used to represent the data in a positional numbering system. Since the Huffman prefixes themselves will also require different amounts of memory due to their differing lengths, shorter Huffman prefix codes may be chosen for the more commonly applied forward map table entry formats. As forward map table entry formats become less common, longer Huffman prefixes may be used. This strategy of allocating Huffman prefixes reduces the memory needed to store the compressed forward map. In an implementation, the compression efficiency of various compression schemes may be evaluated based on the contents of the forward map to choose a compression scheme that has a favorable compression efficiency.

Figure 7:
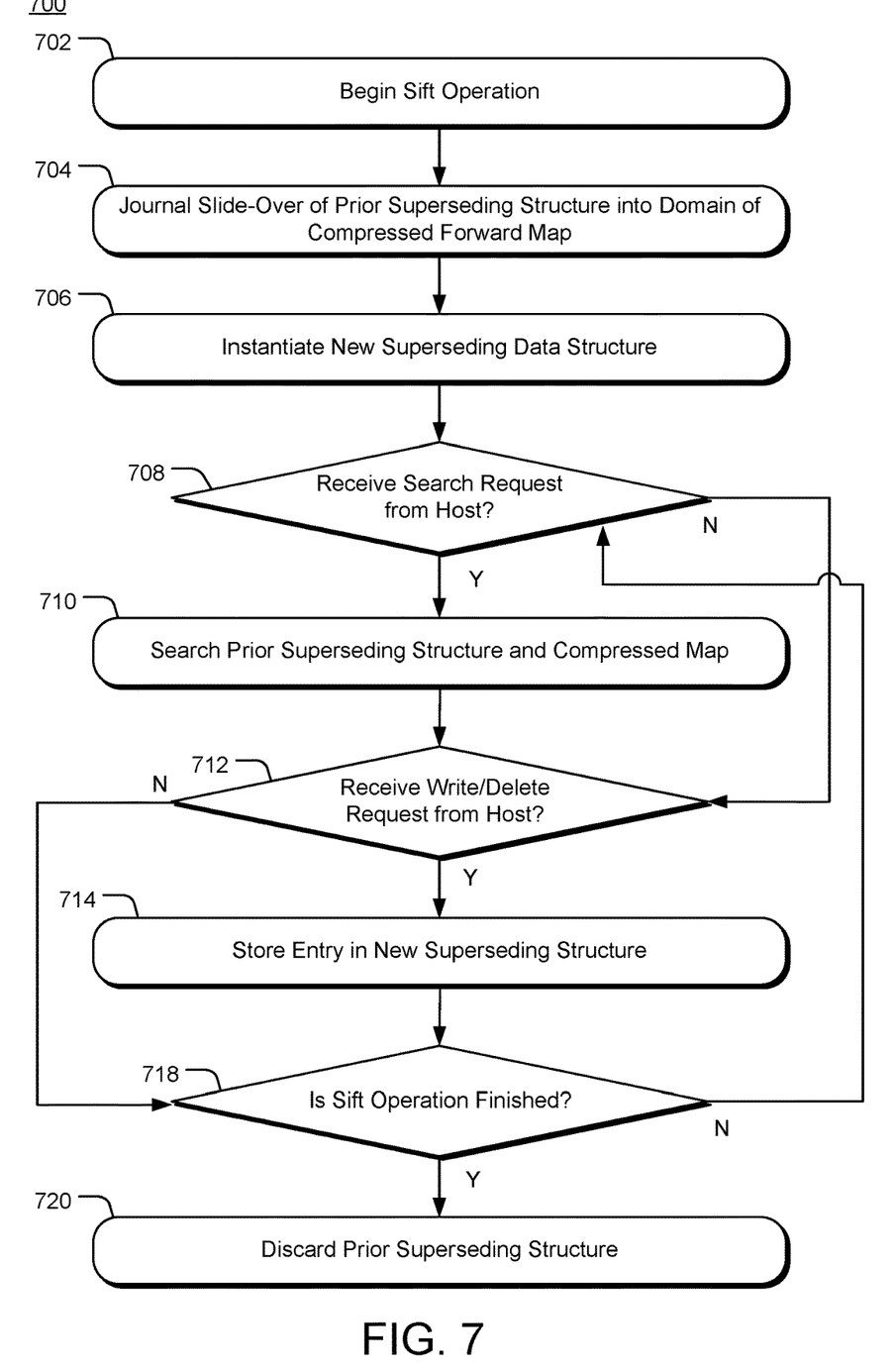
FIG. 7 illustrates example operations for searching and updating a forward map during a sift operation.

FIG. 7 illustrates example operations 700 for searching and updating a forward map during a sift operation. Operation 702 is beginning a sift operation to uncompress a forward map, merge the entries in a superseding data structure into the uncompressed forward map. Some operations that may be included in the sift operation include discarding superseded and deleted entries, inserting new entries, and recompressing the forward map. In an implementation, operation 702 may include only minimally decompressing and recompressing the forward map.

When a sift operation is in progress, such as when a sift module is progressing through the entries in an uncompressed forward map, there are likely to be additional data access requests from the host during the time period in which the sift module is only partially finished processing the entries in the buffer containing the uncompressed forward map. The forward map may remain searchable based on data access requests from the host during this time. Although the sift operation may be computationally intensive, the sift operation need not be a burden on any journaling system that is used to track metadata changes relating to the storage tier. Specifically, the individual modification that comprise the sift, such as removing deleted entries, updating superseded entries, and inserting new entries, need not be journaled. The journal need only describe edits of the compressed forward map and modifications to the superseding data structure. Excessive journal length could be a criteria to start a sift operation as the sifted image can serve as part of a snapshot in the journal system.

When the sift operation is started at operation 702, the concept of the compressed table is instantly expanded to include the current superseding data structure. In other words, a search based on a data access request received from the host becomes a search of the superseding data structure and the actual compressed/uncompressed forward map as well as a search of any new superseding data structure instantiated to replace the data structure slid over into the domain of the compressed list wherein the new superseding data structure would take the highest precedence. A single journal entry can indicate this change at operation 704, which is referred to herein as a "slide-over" because the current superseding data structure is "slid over" into the domain of the compressed forward map. Operation 704 may be carried out by a slide-over module on the storage controller.

Operation 706 is instantiating a new superseding data structure. The new superseding data structure supersedes the prior superseding data structure and the compressed forward map. During the sift operation, the prior superseding data structure and the prior compressed forward map are merged into the new compressed forward map. If a data access request is received from a host at operation 708, then the search/update is carried out on the superseding data structure and the compressed forward map at operation 710. During the sift operation, the expanded concept of the compressed table always gives the same answer to queries regardless of the sift progress due to the combination of the slid over superseding data structure and the compressed forward map. It is this fact that alleviates the burden of journaling the steps in the sift operation. In an implementation, the compressed forward map is not edited during the sift, and instead the newly instantiated superseding data structure is relied upon to supply the results of data access requests received from the host and to receive mapping updates. In another implementation, the compressed forward map is edited during the sift operation.

If a write/delete request is received from the host at operation 712, the updated entry is stored in the newly instantiated superseding data structure at operation 714. When the sift operation is finished at operation 718, the prior superseding data structure is discarded at operation 720. The prior superseding data structure is no longer needed because all content has been sifted into the compressed list and because all updates that occurred during the sift operation were made to the newly instantiated superseding data structure, which will be merged into the forward map during the next sift operation.

In an implementation, a journaling system is used that permits saving a data structure (e.g., the compressed forward map, the superseding data structure, etc.) to an image, followed by a journal giving a history of changes that must be made to the image. The journal giving a history of changes that must be made to the image continues until the next time the data structure is saved, and then additional journaling is performed for changes from the previous save. In other words, the journal system gives a history of the changes since the last time the data structure was saved. This type of journaling system prevents the "power-on replay time" from increasing without bound. In the case of a compressed forward map, the saved image could be the sift result (i.e., the compressed forward map) followed by the history of changes to the new superseding data structure since the time of the "slide-over" of the prior superseding data structure to the domain of the compressed forward map. The journaling system may tag its information with a time or sequence number. When the sift operation completes and the sift result is saved as an image, the journal mechanism may have an updated images available to combine with the journaled history to restore to a pre-power loss state. Even though the journal for the new superseding data structure describes events later in time than the state reflected in the saved image of the sifted compressed forward map, some of those journal events can be recorded before the sift operation is finished creating the sifted compressed forward map image to be saved.

If a power loss event, or other type of reset event, occurs during the sift operation, then the journal replay at power-on must at minimum restore the inputs to the sift operation (e.g., the old compressed forward map and the "slid over" superseding data structure), and replay the changes to the new superseding data structure leading up to the power loss event. The forward map may then be brought back online for responding to search requests received from the host and for accepting updates to the forward map due to host data access requests, and the sift operation may then be restarted. The result of the sift operation will be saved in a data structure image when the sift operation completes, and then the memory resources of the old superseding data structure become available for use in the new superseding data structure. If power loss events occur repeatedly or in rapid succession, the time needed for the sift operation and the image save of the forward map and superseding data structure may be incurred prior to bringing the forward map online for new updates. In an implementation, there is a budget of superseding data structure nodes remaining for use in the new superseding data structure to allow the forward map to remain usable and searchable until the sift operation completes and releases the memory for the "slid-over" superseding data structure.

Although the power-loss behavior described herein may present challenges in some cases, modern equipment including microprocessors and memory architectures may be able to process compressed forward maps containing several million entries in a handful of seconds, which may reduce the impact of an emergency sift if needed to bring the forward map online. In an implementation, the sift module is a custom logic block that may be capable of operating faster than a microprocessor. In another implementation, the sift module may run on a dedicated processing unit concurrently with the rest of the data storage system, such that the processing power needed for sifting operations does not degrade the throughput of other processing elements.

In addition to the aforementioned aspects of recovering from a power-loss event, replaying the journal changes to the superseding data structure may take place concurrently with the load of the latest saved image of the compressed forward map. If there is an entry in the compressed forward map that has an impact on how the journal replay should proceed, that information can be placed in the journal at the time the journal entry is created so that it is available even if the compressed table is not yet resident. In a system that flushes frames of the journal from fast or more precious nonvolatile RAM to slower or more plentiful nonvolatile memory, such extra information can enlarge the journal, but it need not impact any limited nonvolatile RAM that is being used to store the latest frame of the journal. The latest frame of the journal can have a "verbose" large representation and a "terse" smaller representation in fast nonvolatile RAM. The "terse" representation would exclude information that can be obtained from the loaded or replayed tables that must ultimately be resident. Upon each successful journal frame save (e.g., from fast nonvolatile memory to slower, more plentiful nonvolatile memory), the verbose frame is saved and the memory for the terse representation becomes available. During the journal replay, when the verbose journal stream ends and the final, terse frame of the journal is reached, replay could pause until the compressed forward map is fully resident. If edits to the compressed forward map are journaled, then they could be journaled in the verbose stream and placed in a special list of edits to be applied once the compressed image is resident. If journal replay can proceed without the compressed image resident, then it should be able to proceed without the edited compressed image resident.

With regard to the type of encoding used for compressing the forward map, in an implementation an encoding that is highly fixed may be used to achieve a compression ratio that is provable so that a fixed amount of memory can be set aside for the compressed forward map. Other types of compression schemes may seek to create an encoding that is optimized or customized for the data being compressed. A customized or optimized encoding scheme, however, may result in an unpredictable compression ratio and it may be difficult to provision the data storage device with adequate memory to accommodate an unpredictable compression ratio. A highly fixed compression ratio, on the other hand, is applicable to the maximum number of entries to be stored in a particular memory budget, but it can also be proven that the degradation in the compression ratio from fewer entries to compress is a lesser effect than the memory gain arising from fewer entries to compress.

For example, the forward map illustrated in FIG. 3 has a first column for storing the logical block address delta value. Given an entry density (e.g., the number of entries per amount of logical address space), the average logical address delta may be known. Because some entries may be very close together, a few entries may be exceedingly far apart, and other deltas are in between, a provable compression ratio may be computed by constructing the worst-case variance in logical block address deltas and bound the compression ratio using the worst-case scenario.

An example method of any preceding method disclosed herein includes wherein at least one entry in the forward map includes a full-width logical block address field. Another example method of any method disclosed herein includes wherein the updating operation further comprises marking an entry for deletion. Another example method of any preceding method disclosed herein includes the sifting operation including journaling a slide over of the superseding data structure to the domain of the compressed forward map. Another example method of any preceding method disclosed herein includes the sifting operation further comprises instantiating a new superseding data structure to store superseding entries received after the start of the sifting operation. Another example method of any preceding method disclosed herein includes saving the result of the sift operation to a storage media. Another example method of any preceding method disclosed herein includes wherein the saving operation saves a result of the sift operation to a journaling system snapshot. Another example method of any preceding method disclosed herein includes wherein the saving operation saves the result of the sift operation over the course of several media operations. Another example method of any preceding method disclosed herein includes wherein the saving operation saves the result of the sift operation concurrently with an accumulating journal, the accumulating journal including at least a portion of the history of the superseding data structure from the start of the sifting operation. Another example method of any preceding method disclosed herein includes replaying the accumulating journal. Another example method of any preceding method disclosed herein includes during the replaying operation: generating a list of edits to the saved result of the sift operation; storing the list of edits to the saved sift result in a trivial format for application after the saved sift result becomes resident; and wherein the generating and storing operations are performed while the saved sift result is loading.

The implementations described herein may be implemented as logical operations in one or more computer systems. The logical operations of the various implementations described herein are implemented (1) as a sequence of processor-implemented operations executing in one or more computer systems and (2) as an interconnected machine or circuit modules within one or more computer systems. The implementation is a matter of choice, dependent on the performance requirements of the computer system. Accordingly, the logical operations making up the implementations described herein are referred to variously as operations, operations, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application— and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
generating a forward map for a storage tier, the forward map mapping a plurality of logical block addresses to physical locations on the storage tier;
compressing the forward map into a compressed forward map on a storage controller operably coupled to the storage tier;
receiving a request from a host to modify a mapping of a logical block address to a physical location on the storage tier in the forward map; and
updating the compressed forward map in response to the request from the host by reducing a length of a physical location field in an entry while maintaining compression of the forward map.

2. The method of claim 1, further comprising:
locating, in O(log n) time or faster, a region of the compressed forward map corresponding to a logical block address using at least one of: an index file, milestone entries, a tree, and a hash table.

3. The method of claim 1, wherein one or more entries in the forward map include a logical block address delta field, a contiguous number of blocks field, and a physical location field.

4. The method of claim 1, wherein the updating the compressed forward map further comprises updating a superseding data structure, the superseding data structure comprising one of: a tree and a hash table.

5. A system comprising:
a forward map for a storage tier, the forward map mapping a plurality of logical block addresses to physical locations on the storage tier;
a storage controller operably coupled to the storage tier and configured to compress the forward map into a compressed forward map; and
a request to modify a mapping of logical block addresses to physical locations on the storage tier in the forward map by the storage controller
updating the compressed forward map in response to the request by deleting only a portion of an entry extent without decompressing the compressed forward map.

6. The method of claim 5, further comprising:
locating a region of the compressed forward map corresponding to a logical block address using at least one of: an index file, milestone entries, a tree, or a hash table.

7. The method of claim 5, wherein one or more entries in the forward map include a logical block address delta field, a contiguous number of blocks field, or a physical location field.

8. The method of claim 5, further comprising the storage controller updating a superseding data structure, the superseding data structure comprising either a tree or a hash table.

* * * * *